United States Patent
Rosenfellner

(10) Patent No.: US 6,241,804 B1
(45) Date of Patent: Jun. 5, 2001

(54) PROCESS FOR PRODUCING IRON BRIQUETTES AND/OR COLD IRON SPONGE

(75) Inventor: Gerald Rosenfellner, Peter/Au (AT)

(73) Assignee: Voest-Alpine Industrieanlagenbau GmbH (AT)

( * ) Notice: Subject to any disclaimer, the term of this patent is extended or adjusted under 35 U.S.C. 154(b) by 0 days.

(21) Appl. No.: 09/362,166

(22) Filed: Jul. 27, 1999

(30) Foreign Application Priority Data

Aug. 12, 1998 (AT) .................................................. 1365/98

(51) Int. Cl.⁷ .................................................. C21B 11/02
(52) U.S. Cl. .................. 75/488; 75/503; 75/504; 266/173
(58) Field of Search .................. 266/172, 173; 75/488, 500, 503, 504

(56) References Cited

U.S. PATENT DOCUMENTS

| 3,748,120 | 7/1973 | Beggs et al. | 75/35 |
| 4,389,040 | * 6/1983 | Ulrich et al. | 266/173 |
| 4,439,233 | 3/1984 | Faccone | 75/35 |
| 4,946,498 | * 8/1990 | Weber | 266/172 |
| 5,669,955 | * 9/1997 | Vuletic et al. | 75/381 |

FOREIGN PATENT DOCUMENTS

| 2935707 | 3/1980 | (DE) . |
| 56-163209 | 12/1981 | (JP) . |
| 96/23081 | 8/1996 | (WO) . |

* cited by examiner

Primary Examiner—Scott Kastler
(74) Attorney, Agent, or Firm—Ostrolenk, Faber, Gerb & Soffen, LLP

(57) ABSTRACT

A process and apparatus for producing iron briquettes and/or cold iron sponge, in which charge materials (3) which contain lumpy material containing iron oxide are introduced into the reduction zone (2) of a reduction reactor (1), then a hot reduction gas introduced in a feed zone below the reduction zone flows through the charge materials, which are reduced to hot iron sponge which passes through a gas feed zone (8), which is downstream of the reduction zone (2). Reduction gas is introduced into the reduction reactor (1). After the gas has flowed through the reduction zone (2), it is extracted from the reduction reactor (1) as a top gas. To produce cold iron sponge, hot iron sponge is cooled by cooling gas in a cooling zone (10) downstream of the gas feed zone (8) and the sponge is discharged from the reactor (1) through a product-discharge zone (11) downstream of the cooling zone (10). To produce iron briquettes, hot iron sponge is discharged from the reactor (1) in a removal zone (16), which is arranged between the gas feed zone (8) and the cooling zone (10), and the sponge is subjected to a briquetting operation (18). The invention make it possible to select whether to produce cold iron sponge and/or iron briquettes with the same reduction reactor.

10 Claims, 1 Drawing Sheet

PROCESS FOR PRODUCING IRON BRIQUETTES AND/OR COLD IRON SPONGE

BACKGROUND OF THE INVENTION

1. Field of the Invention

The invention relates to a process for producing iron briquettes and/or cold iron sponge, in which charge materials which contain lumpy material containing iron oxide are introduced into the reduction zone of a reduction reactor, then a hot reduction gas flows through the charge materials, which are reduced to hot iron sponge which passes through a gas feed zone, which is downstream of the reduction zone and in which reduction gas is introduced into the reduction reactor, which gas, after it has flowed through the reduction zone, is extracted from the reduction reactor as a top gas, in which process to produce cold iron sponge, hot iron sponge is cooled in a cooling zone downstream of the gas feed zone as a result of cooling gas being passed through it and is discharged from the shaft furnace in a product-discharge zone downstream of the cooling zone. The invention also relates to an installation for carrying out the process.

2. Brief Discussion of the Related Art

Numerous processes for producing iron sponge are known from the prior art, and corresponding installations are commercially available. Processes for producing iron briquettes, and corresponding installations, are also known.

U.S. Pat. No. 3,748, 120 has disclosed a process and a device for reducing iron oxide to form metallic iron. In this process, iron oxide is reduced to form iron sponge in a direct reduction reactor, by reduction gas being passed through, and the iron sponge is cooled by cooling gas being passed through and is discharged from the reduction reactor.

SUMMARY OF THE INVENTION

In DE-C 29 35 707 C2, as well as in U.S. Pat. No. 4,439,233, in order to produce iron sponge, iron oxide is again reduced to form iron sponge in a direct reduction reactor, by reduction gas being passed through. However, the iron sponge is not cooled, but rather is discharged from the reduction reactor in the hot state and is subjected to a hot-briquetting operation.

Processes and installations of the type described above have the drawback that they are each only able to produce one type of product, i.e. either iron sponge or iron briquettes.

After it has been produced, iron sponge is processed further as quickly as possible, for example in a melt-down gasifier or an electric arc furnace, to produce liquid pig iron or steel, and is not usually a product which can be used commercially.

Iron briquettes are used for the same purposes as iron sponge, but unlike the latter can be stored for an unlimited period and therefore constitute a product which can be used commercially.

In order, in a reduction reactor for producing iron sponge, to avoid standstills which may occur, for example, when a steel works which is linked to the reactor is unable to accommodate any iron sponge, it has hitherto been necessary to provide a plurality of product hoppers, each with a storage capacity of approximately 5000 t or more. If the buffer capacity of the product hoppers is insufficient, the reduction reactor may have to be shutdown, since otherwise iron sponge would have to be stored in the open air, and the iron sponge would not be protected from environmental influences, such as for example rain.

Both the set-up costs and the operating costs of product hoppers constitute a considerable economic burden on a metallurgical plant. Both the loss of production caused by shutting down the reduction reactor and starting it up again and the resultant costs are undesirable and reduce the economic efficiency of a metallurgical plant.

Therefore, the object of the present invention is to provide a process for the reduction of iron oxide which makes it unnecessary to set up and operate product hoppers. If iron sponge cannot be processed further immediately, the intention is that it should no longer be necessary to shutdown the reduction reactor, thus avoiding production losses. Furthermore, it is intended for it to be possible to convert existing installations for the production of iron sponge in a simple, inexpensive manner.

According to the invention, this object is achieved by the fact that to produce iron briquettes, hot iron sponge is discharged from the shaft furnace in a removal zone, which is arranged between the gas feed zone and the cooling zone, and is subjected to a briquetting operation.

Lumpy material containing iron oxide is understood to mean both lump ore and iron ore pellets.

The process according to the invention makes it possible, for the first time, to choose to produce iron briquettes and/or cold iron sponge, since a single process is able to deliver two different types of product; cold iron sponge is understood here to mean iron sponge at a temperature of approximately 30 to 100° C. This flexibility makes both product hoppers and any need to shutdown the reduction reactor in which the process is being carried out superfluous.

According to one embodiment of the process according to the invention, the production of cold iron sponge can be interrupted temporarily. This ensures that cold iron sponge is not "over produced". In situations where the capacity of the reduction reactor to produce iron sponge is greater than the requirements of a linked steel works, this excess capacity can be sold in the form of iron briquettes.

According to a further embodiment of the process according to the invention, the production of iron briquettes can also be interrupted, for example in order to use the entire production capacity to produce iron sponge.

Advantageously, the hot iron sponge which is discharged from the removal zone is still at a temperature of from 600 to 1000° C., preferably 650 to 850° C., during the briquetting.

The hot iron sponge is therefore briquetted in the hot state. Consequently, the addition of binders, which is required for cold briquetting, can be largely eliminated. Compared to hot briquetting of cold iron sponge, this process also has the advantage that there is no need to employ additional energy to heat the iron sponge.

According to an advantageous embodiment of the process according to the invention, the hot iron sponge is briquetted under an inert-gas atmosphere or under a reducing atmosphere, in order to protect the iron from being reoxidized during the briquetting operation.

Preferably, the inert gas or reducing gas used is nitrogen, top gas, flue gas or mixtures of these gases. Large volumes of each of these gases are available in metallurgical plants; top gas, as a partially reacted reduction gas, is particularly suitable for use as an inert gas. If appropriate, the $CO_2$ and $H_2O$ levels in the top gas and/or flue gas are reduced to a sufficient extent for there no longer to be any risk of reoxidation of the briquetted iron or iron which is to be briquetted, before the top gas and/or flue gas is/are used as inert gas.

According to one embodiment of the process according to the invention, during the production of iron briquettes, small quantities of cold iron sponge are discharged from the shaft furnace at recurring intervals, in the product discharge zone. This avoids agglomeration of the iron sponge particles in the cooling zone and product discharge zone, and the production of cold iron sponge can be resumed at any time.

The invention also relates to an installation for producing iron briquettes and/or cold iron sponge from charge materials which contain lumpy material containing iron oxide, having a reduction reactor, which is aligned essentially vertically, for iron oxide, with an upper reduction zone and a lower cooling zone, and having a device for introducing material which contains iron oxide into the reduction zone, having a gas feed zone, which is arranged beneath the reduction zone, and a reduction gas feed line, which connects the gas feed zone to a reduction gas source, having a discharge device, which is arranged beneath the cooling zone, for discharging reduction product from the reduction reactor, having a top-gas discharge line for removing the reacted reduction gas from the reduction reactor, and having a device for introducing and extracting a cooling gas into and from the cooling zone.

Such an installation is characterized in that a device for discharging hot iron sponge is provided in a removal zone, which is arranged between the gas feed zone and the cooling zone or immediately upstream of the gas feed zone, and in that the device for discharging hot iron sponge is connected to a briquetting device.

By means of the installation according to the invention, it is possible, for the first time, to choose to produce iron briquettes and/or cold iron sponge. The location where the hot iron sponge is removed is selected in such a way that the iron sponge is still at the temperatures required for a hot-briquetting operation or for further use, for example in a melt-down gasifier, converter or electric furnace, or still has a sufficient degree of metallization to be sold.

Existing installations for producing cold iron sponge can easily and inexpensively be retrofitted with a discharge device and a briquetting device without causing significant loss of production.

According to a preferred embodiment, the device for discharging the hot iron sponge is formed, in a manner known per se, by one or more screw conveyors which pass through the casing of the reduction reactor.

In order to protect the hot iron sponge from reoxidation during the briquetting operation, it is advantageous to prevent oxygen or air from entering.

To this end, the briquetting device is provided with an inert-gas system, by means of which inert and/or reducing gases, i.e., for example, nitrogen and/or top gas and/or flue gas, are guided through the briquetting device. The gases are preferably circulated, in order to minimize losses of heat and volume.

If necessary, the top gas and/or flue gas can be conditioned before being used as inert gas, for example using a conditioning system comprising one or more of the following elements: post-combustion, compressor, cooler and $CO_2$ elimination.

The iron briquettes, which after briquetting are still at a temperature of approximately 550 to 700° C., can be cooled in a manner known per se by utilizing their sensible heat, as disclosed, for example, in EP-A-0,807,187 or JP-A 56-163209.

BRIEF DESCRIPTION OF THE DRAWING

The process and installation according to the invention are explained in more detail below with reference to the exemplary embodiment which is diagrammatically depicted in FIG. 1.

DESCRIPTION OF THE PREFERRED EMBODIMENT

Figure 1:
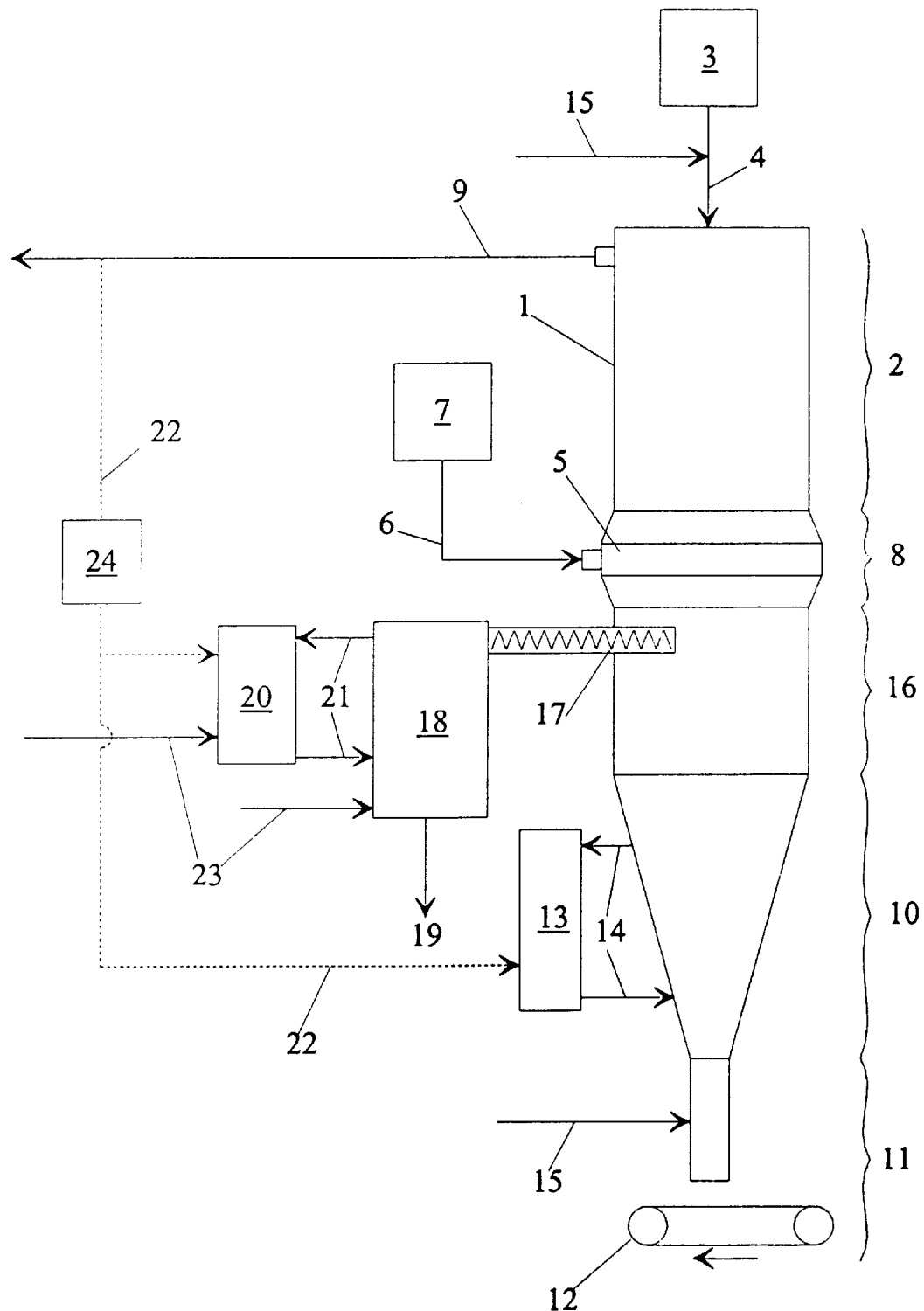

Lumpy material 3 which contains iron oxide is introduced, by means of a charging device 4, into a reduction reactor 1 or its reduction zone 2, where it forms a charge bed. In a gas feed zone 8, hot reduction gas is blown into the reduction reactor 1 by means of a device 5 for introducing a reduction gas, which is connected to a reduction gas source 7, for example a reformer or a melt-down gasifier, via a reduction gas feed line 6.

The reduction gas flows upwards through the charge bed of material 3 containing iron oxide and reduces all or some of this material to form hot iron sponge.

The device 5 for introducing reduction gas is designed as an annular chamber which surrounds the casing of the reduction reactor 1 in a ring and from which a number of gas feed ducts open into the reduction reactor 1 or its gas feed zone 8.

The partially reacted reduction gas is extracted from the reduction reactor 1 as top gas via a top-gas discharge line 9.

The hot iron sponge is cooled in a cooling zone 10 arranged downstream of the gas feed zone 8, and the cold iron sponge is discharged from the reduction reactor 1 in a product-removal zone 11, by means of a discharge device 12 which is designed, for example, as a belt conveyor.

To cool the hot iron sponge, the cooling zone 10 has a device 13 for introducing a cooling gas, for example nitrogen and/or top gas. The cooling gas device 13 comprises, in a conventional way, a gas-purifying device, for example a wet scrubber, a means for conveying the cooling gas, for example a compressor, as well as gas feed and discharge lines 14 which connect the device and the cooling zone 10, so that the overwhelming proportion of the cooling gas is circulated.

Both in the product-removal zone 11 and at the charging device 4, the reduction reactor 1 is sealed by a sealing gas, usually nitrogen, which is fed by means of sealing-gas lines 15, to prevent reduction gas from leaving.

A discharge device 17 for hot iron sponge, which is designed, for example, as one or more screw conveyors, is provided in a removal zone 16 arranged between the cooling zone 10 and the gas feed zone 8.

The hot iron sponge which is discharged from the reduction reactor 1 by the discharge device 17 is processed to form iron briquettes 19 in a briquetting device 18. During the briquetting operation, the hot iron sponge is still at temperatures of from 600 to 1000° C., and some of the sponge would be oxidized again if it were to come into contact with oxygen or air.

In order to avoid this, the briquetting device 18 is provided with an inert-gas system 20. In this system, inert or reducing gas is for the most part circulated between briquetting device 18 and inert-gas system 20 by means of gas lines 21.

If appropriate, a gas line 22, via which the inert-gas system 20 is supplied with inert or reducing gas and/or the cooling-gas device 13 is supplied with cooling gas, branches off from the top-gas discharge line 9. A conditioning system 24, comprising, for example, post-combustion device, compressor, cooling and $CO_2$ elimination, is arranged in the gas line 22.

The inert-gas system 20 is formed in a conventional manner by a gas-purifying device, a means for conveying the inert or reducing gas, and, if appropriate, a $CO_2$-elimination device.

Both the briquetting device 18 and the inert-gas system 20 are also provided with further feed lines 23 for inert gases, usually nitrogen or treated or conditioned flue gas.

The invention is not limited to the exemplary embodiment depicted in FIG. 1, but rather also comprises all means which are known to the person skilled in the art and can be used to carry out the invention. For example, the reduction reactor may be sealed by means of rotary valves instead of by feeding sealing gas, in order to prevent reduction gas from leaving.

What is claimed is:

1. Process for producing iron briquettes and/or cold iron sponge separately or simultaneously using a single reduction reactor, comprising:

introducing charge materials which contain lumpy material containing iron oxide into a reduction zone of the reduction reactor, then flowing a hot reduction gas into a gas feed zone located downstream of the reduction zone in the reactor, and permitting the hot reduction gas to flow through the charge materials, which are reduced to hot iron sponge;

passing the hot iron sponge through the gas feed zone downstream of the reduction zone while introducing reduction gas into the reduction reactor;

after the reduction gas has flowed through the reduction zone, extracting the gas from the reduction reactor as a top gas;

the process further comprising:
   a) to produce cold iron sponge, cooling hot iron sponge in a cooling zone in the reduction reactor located downstream of the gas feed zone by passing cooling gas through the hot iron sponge in the cooling zone; and discharging the cooled sponge through a product-discharge zone located downstream in the reduction reactor of the cooling zone; and
   b) to produce iron briquettes, discharging hot iron sponge from the reduction reactor in a removal zone arranged in the reduction reactor between the gas feed zone and the cooling zone or immediately upstream of the gas feed zone, and subjecting the hot iron sponge to a briquetting operation.

2. Process according to claim 1, wherein the temperature of the iron sponge during the briquetting operation is from 600 to 1000° C.

3. Process according to claim 1 wherein the iron sponge is briquetted under an inert gas atmosphere or under a reducing atmosphere.

4. Process according to claim 3, wherein the inert gas used is nitrogen and/or flue gas and/or top gas.

5. Process according to claim 4, further comprising subjecting flue gas and/or top gas to an operation in which $CO_2$ and/or $H_2O$ is eliminated, before being used as inert gas.

6. Process for producing iron briquettes according to claim 1, further comprising discharging small amounts of cold iron sponge from the shaft furnace at regular intervals in the product-discharge zone, for avoiding agglomeration of the iron sponge particles in the cooling zone and the product discharge zone.

7. Installation for producing iron briquettes and/or cold iron sponge from charge materials which contain lumpy material containing iron oxide, the installation comprising:

a reduction reactor, which is aligned essentially vertically, for iron oxide, the reactor including
      an upper reduction zone and a lower cooling zone,
      a device for introducing material which contains iron oxide into the reduction zone,
      a gas feed zone arranged beneath the reduction zone;
      a reduction gas feed line which connects the gas feed zone to a reduction gas source;
      a discharge device arranged beneath the cooling zone for discharging reduction product from the reduction reactor;
      a top-gas discharge line for removing the reacted reduction gas from the reduction reactor;
      a device for introducing and extracting a cooling gas into and from the cooling zone;
      a removal zone and a discharge device for discharging hot iron sponge from the removal zone, the discharge device being arranged between the gas feed zone and the cooling zone or immediately upstream of the gas feed zone; and
      a briquetting device connected to the discharge device.

8. Installation according to claim 7, wherein the reduction reactor has a casing and the discharge device for discharging the hot iron sponge is formed at least by one screw conveyor which passes through the casing of the reduction reactor.

9. Installation according to claim 7, wherein the briquetting device is provided with an inert-gas system.

10. Process according to claim 1, wherein the temperature of the iron sponge during the briquetting operation is from 650 to 850° C.

* * * * *